US007925478B2

(12) United States Patent
Wu et al.

(10) Patent No.: US 7,925,478 B2
(45) Date of Patent: Apr. 12, 2011

(54) METHOD FOR AUTOMATICALLY DESIGNING BUFFER PACKING SIZE AND COMPUTER ACCESSIBLE STORAGE MEDIA TO STORE PROGRAM THEREOF

(75) Inventors: Cheng-Yu Wu, Taipei (TW); Ting-Chuan Chang, Taipei (TW); Chih-Chen Lo, Taipei (TW); Jia-Li Wang, Taipei (TW)

(73) Assignee: Inventec Corporation, Taipei (TW)

( * ) Notice: Subject to any disclaimer, the term of this patent is extended or adjusted under 35 U.S.C. 154(b) by 1091 days.

(21) Appl. No.: 11/675,835

(22) Filed: Feb. 16, 2007

(65) Prior Publication Data

US 2008/0140245 A1 Jun. 12, 2008

(30) Foreign Application Priority Data

Dec. 7, 2006 (TW) ................................ 95145599 A

(51) Int. Cl.
 *G06F 9/455* (2006.01)
(52) U.S. Cl. ............................... 703/7; 206/588; 257/702
(58) Field of Classification Search .................. 703/1, 6, 703/7; 206/586, 587, 588; 438/113; 257/700
See application file for complete search history.

(56) References Cited

U.S. PATENT DOCUMENTS

| 5,692,618 | A | * | 12/1997 | Beak .............................. 206/586 |
| 6,242,799 | B1 | * | 6/2001 | Horiuchi et al. .............. 257/700 |
| 6,843,374 | B1 | * | 1/2005 | Li et al. ......................... 206/587 |
| 2003/0234207 | A1 | * | 12/2003 | Koike ............................ 206/588 |
| 2006/0205114 | A1 | * | 9/2006 | Matsushita .................... 438/113 |

OTHER PUBLICATIONS

Lye et al., "Virtual design and testing of protective packaging buffers", Computers in Industry, 2003.*
Low, K.H., "Drop-impact cushioning effect of electronic products formed plates", Advances in Engineering software, Aug. 2002.*
Hanlon, J.F., Hanfbook of Pacjkage Engineering, Second Edition, 1984. Section 16, Cushioning.*
ASTM. 1985 Annual Book of ASTM standards, Section 15, Paper; Packaging; Flexible barrier materials; Business copy products, p. 345-352.*
Sek et al., "A new method for the determination of cushion curves", Packaging technology and science, 2000.*
Somchai et al., "An integrated design approach for protective packaging", Intergrtaed Manufacturing systems, vol. 11; 2000.*
Lye et al., "The distributive area ratio in determination of protective packaging design configuration", Int. J. of Product Research, vol. 35, 1997.*
Lye et al., "Predictive characterization omodel for impact cushioning curves: configuring the predictive characterization model", Journal of materials Engineering and performance, Apr. 1997.*

* cited by examiner

*Primary Examiner* — Kandasamy Thangavelu
(74) *Attorney, Agent, or Firm* — J.C. Patents

(57) ABSTRACT

A method for automatically designing a buffer packing size and a computer accessible storage media to store program thereof are provided. First, a buffer thickness of a buffer material is calculated, and a buffer area for a surface of the object receiving an impact is calculated according to a weight of an object and a static stress of the buffer material. Next, a suitable buffer packing size is automatically calculated according to the buffer thickness and the buffer area.

10 Claims, 5 Drawing Sheets

|  test height: 60cm  |  | test height: 75cm |  | test height: 90cm |  |
|---|---|---|---|---|---|
| static stress value | test acceleration | static stress value | test acceleration | static stress value | test acceleration |
| 0.014 | 76.2 | 0.014 | 88.7 | 0.014 | 104.9 |
| 0.021 | 68.2 | 0.021 | 83.7 | 0.021 | 94.3 |
| 0.028 | 65.6 | 0.028 | 81.1 | 0.028 | 97.5 |
| 0.035 | 64.8 | 0.035 | 83.6 | 0.035 | 106.3 |
| 0.042 | 67.4 | 0.042 | 86.3 | | |
| 0.056 | 73.1 | 0.056 | 106.8 | | |

US 7,925,478 B2

METHOD FOR AUTOMATICALLY DESIGNING BUFFER PACKING SIZE AND COMPUTER ACCESSIBLE STORAGE MEDIA TO STORE PROGRAM THEREOF

CROSS-REFERENCE TO RELATED APPLICATION

This application claims the priority benefit of Taiwan application serial no. 95145599, filed on Dec. 7, 2006. All disclosure of the Taiwan application is incorporated herein by reference.

BACKGROUND OF THE INVENTION

1. Field of the Invention

The present invention relates to a method for designing a buffer packing, and more particularly to a method for automatically designing a buffer packing size and a computer accessible storage media to store program thereof.

2. Description of Related Art

In the process of packing an object, cushioning material (for example, polymer foam) is normally used to station the object in a position inside a packing box and provide a buffering space for minimizing impact or vibration to the object during transportation. Hence, damage to the object is minimized and the object arriving in perfect shape and function is ensured. For most electronic products, the design of a suitable buffer packing for protecting the object during shipment is particularly important.

At present, buffer packing size is designed by engineers according to their own experience and then verified by performing actual tests. Through repeated designs and tests, the required size is obtained. In general, the buffer packing size is based on the weight and size of the object. Other considerations for designing the buffer packing include possible impact and pressure on the object. However, this kind of design method not only wastes a lot of time, but also increases production cost. Furthermore, if the design engineer is new in this area, more time has to be spent on designing the buffer packing due to lack of experience. As a result, even more time have to be spent on designing the buffer packing and verifying the design through tests.

SUMMARY OF THE INVENTION

Accordingly, the present invention is directed to a method for automatically designing a buffer packing size that can automatically design a suitable buffer packing size according to some desired conditions.

To achieve these and other advantages, as embodied and broadly described herein, the invention provides a method for automatically designing a buffer packing size. The method includes selecting a buffer material and calculating a buffer thickness of the buffer material. Next, an object is selected. A buffer area is calculated according to a surface on the object for receiving an impact. Thereafter, a buffer packing type is selected from a database and the buffer packing type includes a plurality of leg cushions. Finally, the size of each leg cushion is calculated.

The present invention also provides another method for automatically designing a buffer packing size. The buffer packing is used for buffering any impact of an object. The method includes providing a static stress table. Next, a test height H, a safety factor a', a test acceleration G' and weight W of the object are provided, and a buffer thickness T is calculated by using the formula $T=(H*a')/G$. Thereafter, according to the test height H, the test acceleration G' and the buffer thickness T, the static stress table is looked up to obtain a static stress value S. Finally, a calculation using the formula $A=W/S$ is performed to obtain a buffer area A.

The present invention also provides a computer accessible storage media for storing a computer program. The computer program can be downloaded to a computer system such that the computer system can execute the foregoing method for automatically designing a buffer packing size.

The present invention automatically calculates the buffer thickness and the buffer area according to some condition parameters and then selects a suitable buffer packing type and size so that the buffer packing is able to produce a design with the best economic effects. Therefore, the present invention is convenient to use and saves considerable time.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
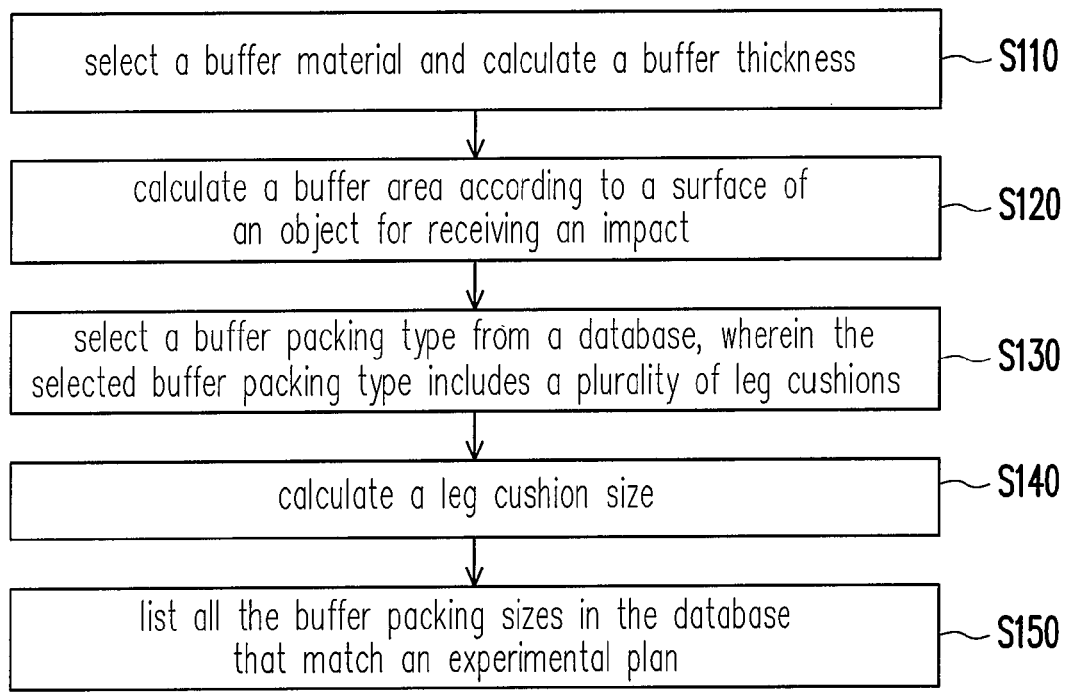
FIG. 1 is a flow diagram of a method for automatically designing a buffer packing size according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

To provide a better understanding of the content of the present invention, embodiments are provided below to serve as examples of actual implementations.

FIG. 1 is a flow diagram of a method for automatically designing a buffer packing size according to one embodiment of the present invention. As shown in FIG. 1, a buffer material is first selected in step S110 so that a required buffer thickness may be calculated. When an object is dropped, packing the object with a buffer material having a sufficient buffer thickness can reduce the impact force, similar to the effect produced by a soft cushion. The buffer material can be extruded polyethylene (EPE), polymer foam, or chevron paper, for example. Since different buffer material has different buffer coefficient, the required buffer thickness is different as well. In general, the degree of damage to the object is closely related to the height of the drop. In addition, according to Newton's force laws, the impact force received by an object dropping to the floor is related to acceleration. Therefore, the thickness of the buffer material for cushioning a dropped object may be calculated according to the test acceleration, the drop height and the safety factor of the buffer material.

Next, in step S120, the buffer area is calculated according to the surface of the packing object for receiving an impact. In other words, when the object is dropped, only one of the surfaces will receive an impact (if the condition of bouncing after an impact of the object is not considered). Therefore, according to the test height of the object in step S110, a corresponding test height is chosen from the static stress table so that the static stress value corresponding to the smallest test acceleration is selected. Afterwards, the buffer area is calculated according to the weight and static stress value of the object.

Figure 2:
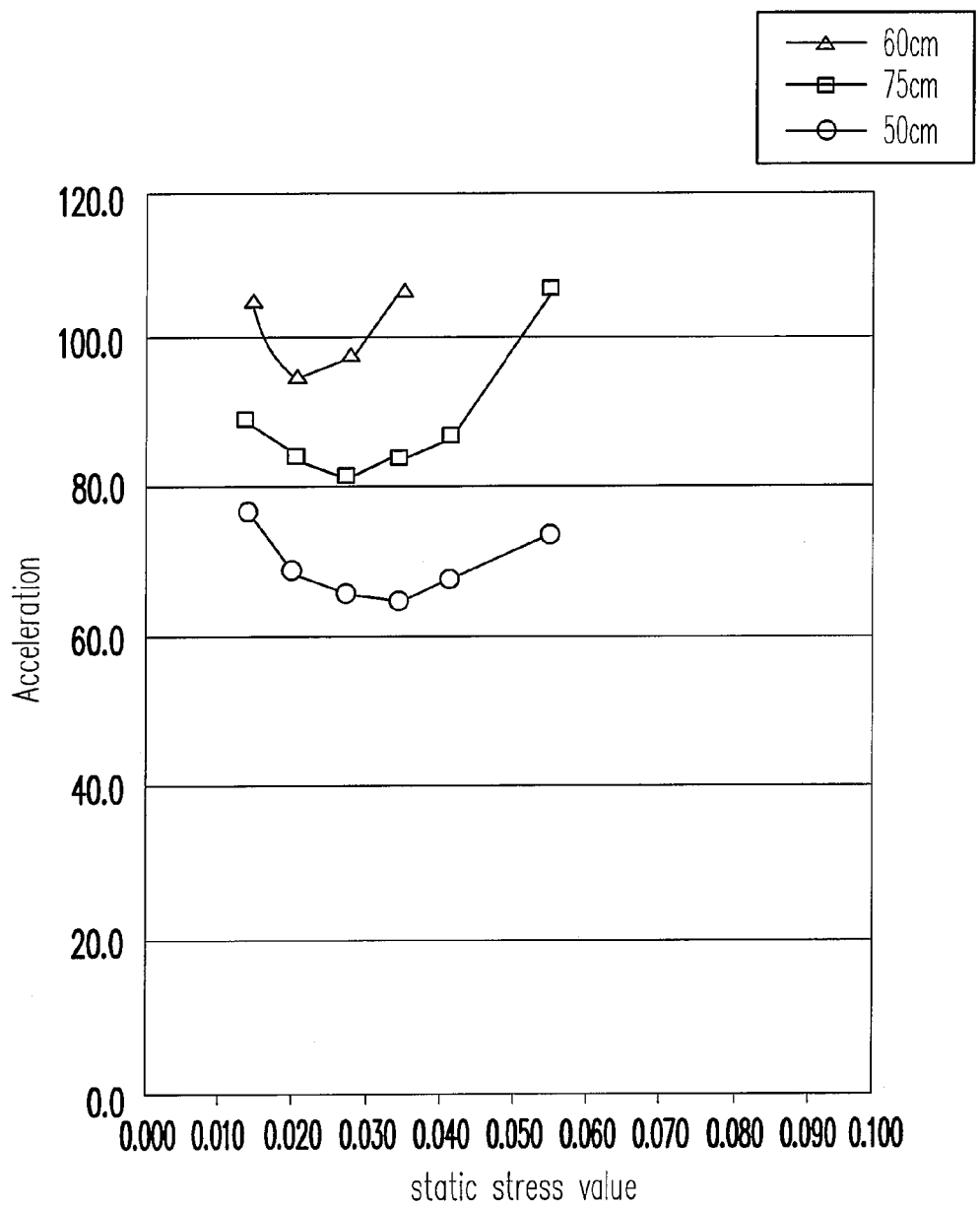
FIG. 2 shows a graph and static stress table according to one embodiment of the present invention.

For example, FIG. 2 shows a graph and static stress table according to one embodiment of the present invention. As shown in FIG. 2, the curves in the upper graph are drawn based on the static stress table below. The vertical axis of the upper graph is the test acceleration and the horizontal axis is the stress value. Each of the three curves in the graph represents the static stress value versus test acceleration at a different test height. Assuming the test height of the object is 90 cm, the static stress value corresponding to the smallest test acceleration is found from the static stress table [test height=90 cm], the static stress value is 0.021. Therefore, the buffer area may be calculated according to the static stress value and the weight of the object.

Thereafter, as shown in FIG. 1, in step S130, a buffer packing type is selected from a database. Furthermore, this buffer packing type further includes a plurality of leg cushions. Because of environmental protection and the need to conserve buffer packing material, most objects are packed without full buffer packing (that is, the space between object and an outer packing being completely filled by a buffer material) aside from a few specified objects. Instead, a plurality of leg cushions is used to support a few local sections or corner sections of the object so that the object is buffered after an impact. Therefore, different buffer packing types can be selected according to the characteristics of the object.

For example, the database can be established based on years of experience of designing buffer packing. Moreover, the kind of buffer material and buffer packing type suitable for a particular kind of object may also be established. Even if the object belongs to a new product, the data in the database may be used to select a suitable buffer material. For example, if the new product is an electronic product, the database can be searched to find a buffer material suitable for most electronic products and use that as the buffer material. Thereafter, the buffer thickness and the buffer area are calculated to select the most suitable buffer packing type. In addition, the object and its corresponding result are saved in the database so that experience is accumulated for subsequent reference. However, this serves only as a convenient description and would not limit the scope of the present embodiment.

As shown in FIG. 1, in step S140, the size of the leg cushion is calculated and determined such that the leg cushion size is compatible with the buffer area. The leg cushion size can be calculated according to the size of the object and the buffer thickness. Furthermore, the total area of each of the surfaces of the object in contact with the buffer material should be larger than or equal to the foregoing calculated buffer area so that there is sufficient buffer area to withstand the impact force after impact and prevent the buffer packing from breaking and exposing the object to the damaging effects of the impact.

Figure 3:
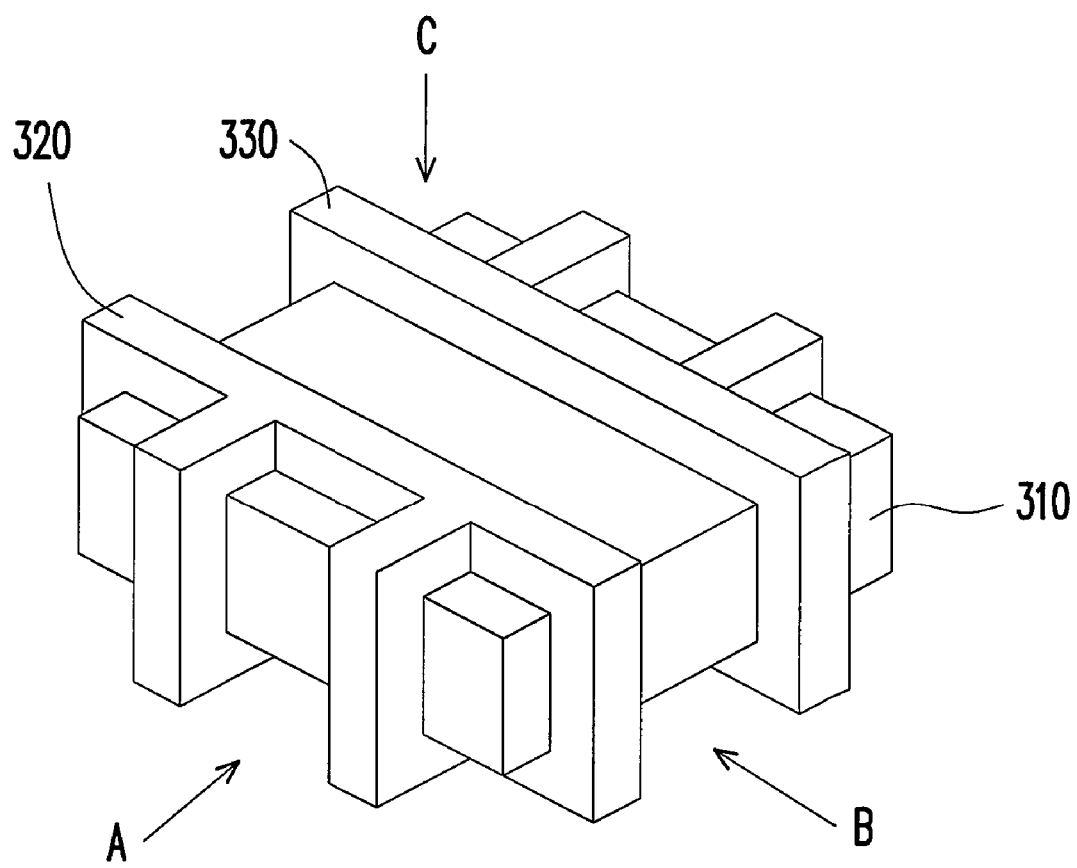
FIG. 3 is a schematic diagram of a buffer packing according to one embodiment of the present invention.
Figure 4A:
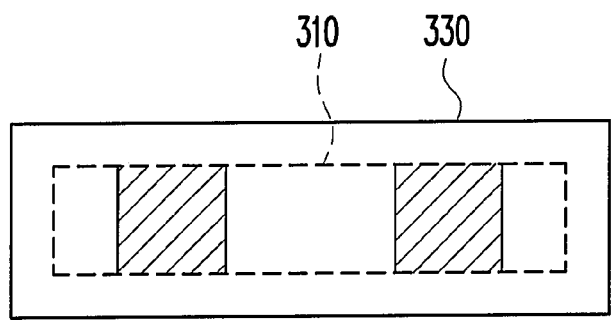
FIG. 4A is a plane diagram of the side of the buffer packing 330 viewing in direction A as indicated by the arrow in FIG. 3.
Figure 4B:
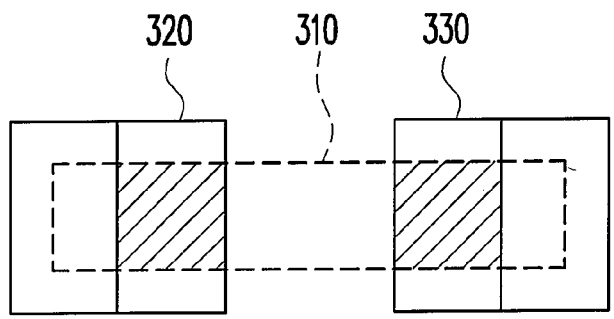
FIG. 4B is a plane diagram of the side of the buffer packing 320 and 330 viewing in direction B as indicated by the arrow in FIG. 3.
Figure 4C:
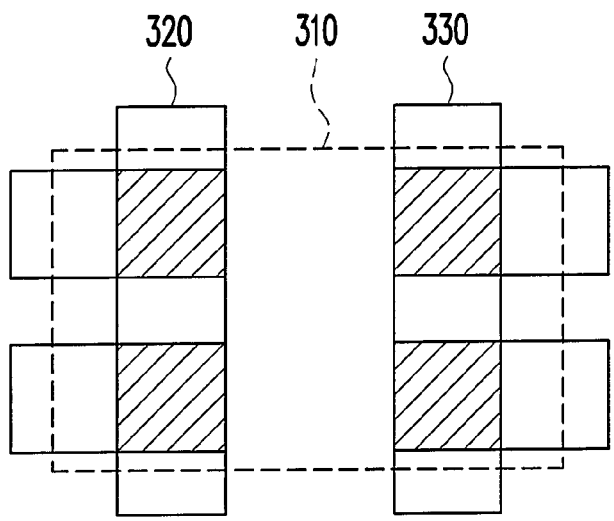
FIG. 4C is a plane diagram of the top of the buffer packing 320 and 330 viewing in direction C as indicated by the arrow in FIG. 3.

For example, FIG. 3 is a schematic diagram of a buffer packing according to one embodiment of the present invention. As shown in FIG. 3, the present embodiment has a buffer packing type that includes a left and a right buffer packing (320 and 330) encasing the object 310. FIG. 4A is a plane diagram of the side of the buffer packing 330 viewing in direction A as indicated by the arrow in FIG. 3. FIG. 4B is a plane diagram of the side of the buffer packing 320 and 330 when viewed from direction B as indicated by the arrow in FIG. 3. FIG. 4C is a plane diagram of the top of the buffer packing 320 and 330 when viewed from direction C as indicated by the arrow in FIG. 3. As shown in FIGS. 4A, 4B and 4C, the rectangle area enclosed by dash lines in each diagram is a surface of the object 310 looking from the directions indicated by the arrows A, B and C respectively. Furthermore, the shaded portions (shaded with slash lines) in each diagram are the areas of the leg cushion for receiving an impact, and the total area obtained by adding all the shaded areas in each diagram together should be larger than or equal to the buffer area. In other words, each of the shaded area in FIG. 4A has to be at least 0.5 times the buffer area, each of the shaded area in FIG. 4B has to be at least 0.5 times the buffer area, and each of the shaded area in FIG. 4C has to be at least 0.25 times the buffer area. Therefore, after obtaining the area of each leg cushion, the shape of the buffer packing type may be determined by the buffer thickness and the object size. However, the present embodiment is described for illustrating the present invention and is not intended to limit the scope of the present invention.

As shown in FIG. 1, after calculating the size of each leg cushion, a buffer packing size matching the experimental plan according to the values obtained in the foregoing step is searched and found from the database. The experimental plan is, for example, a space filling experimental plan. The present embodiment together with the experimental plan that needs to be executed and according to the condition parameters (for example, the buffer material, the object that needs a buffer packing), a leg cushion size of a buffer packing type fitting our description can be automatically found. Hence, the time for accurately designing the packing can be effectively reduced and the experience gain in the design process may be subsequently used as a reference.

Figure 5:
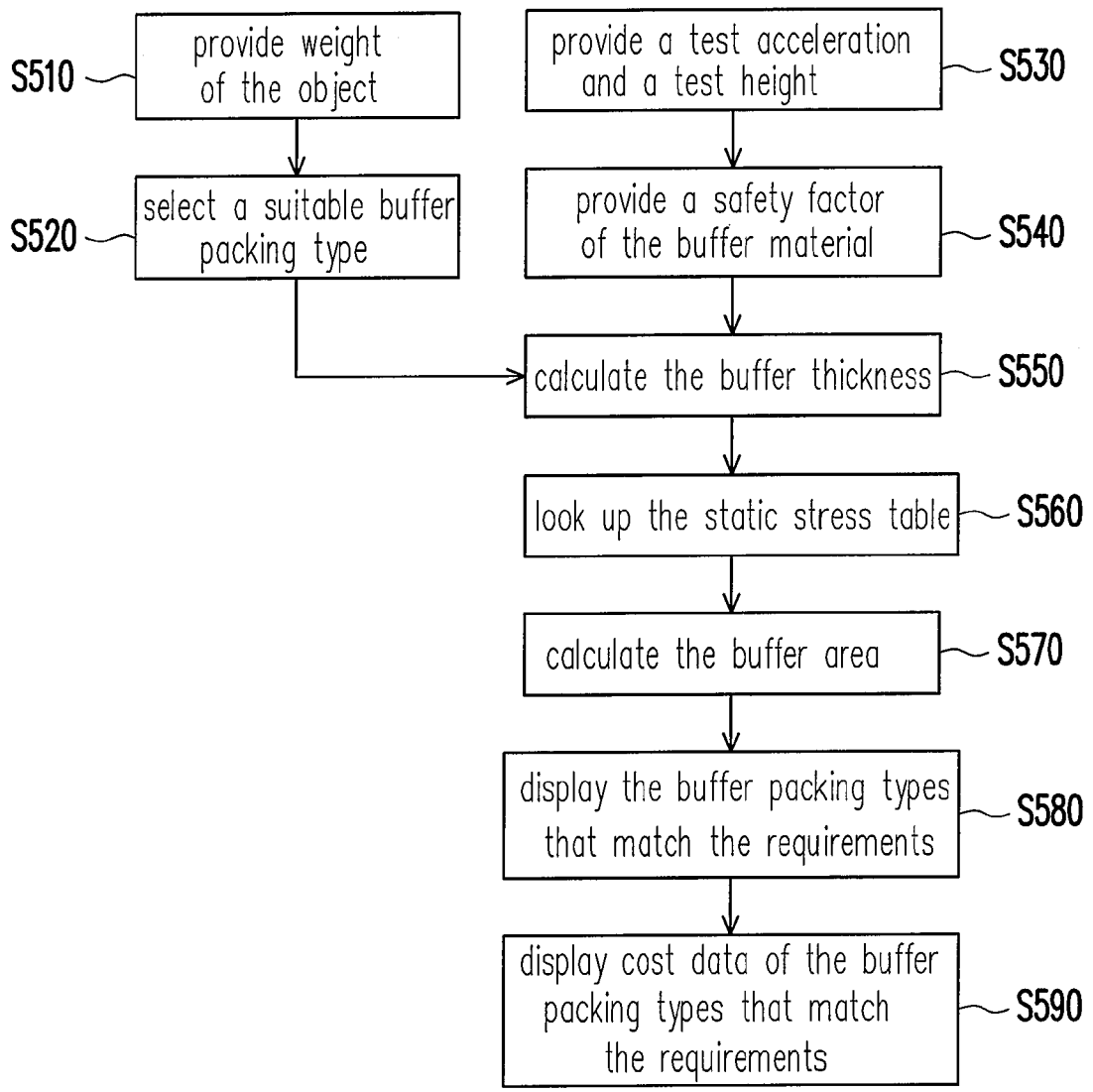
FIG. 5 is a flow diagram of a method for automatically designing a buffer packing size according to another embodiment of the present invention.

FIG. 5 is a flow diagram of a method for automatically designing a buffer packing size according to another embodiment of the present invention. As shown in FIG. 5, the buffer packing is used for buffering an object against an impact. First, in step S510, the weight W of an object that needs to be packed is provided. Next, in step S520, a suitable buffer packing type is selected. The buffer packing type may be selected according to the weight of the object and the size of the object so that the object is able to withstand the impact force on impact. For example, a buffer packing type suitable for buffering a square object may not be suitable for buffering a rectangular object, and a buffer packing type suitable for buffering a light object may not be suitable for a heavy object.

It should be noted that a database is set up in the present embodiment. Furthermore, this database includes a plurality of buffer packing types accumulated from the past experience of designing buffer packing. In step S520, a suitable buffer packing type may be selected from the database.

Next, in step S530, a test acceleration G' and a test height H are provided. In step S540, a safety factor a' of the buffer material is provided. In step S550, a buffer thickness T of the buffer material is calculated. According to the selected buffer material, a different safety factor may be used, and the buffer material may be selected according to the type of object or according to the weight of the object. However, no restrictions are put on the selection of buffer material. Furthermore, since the object is dropped from a human hand during the test, the test acceleration should be greater than acceleration due to gravity. In step S550, the formula T=(H*a')/G' may be used to obtain the buffer thickness T.

Next, in step S560, according to the test height, the test acceleration and the buffer thickness, the static stress table is looked up to obtain a static stress value S. The static stress table (as shown in FIG. 2) may be provided by the manufacturer of the buffer material. The static stress table includes different groups of test accelerations and static stress values according to different test heights. For example, the static stress value corresponding to the smallest test acceleration is selected according to the test height from the static stress table.

Thereafter, in step S570, the buffer area A is calculated using the parameters provided above. The formula A=W/S can be used to obtain the buffer area A.

For example, if extruded polyethylene (EPE) is used as the buffer material for packing a notebook computer with a weight of 2.8 kilograms. Furthermore, if the safety factor of the extruded polyethylene is 3.1, the test height H is 90 cm, the test acceleration G' is 100 G (acceleration due to gravity), the static stress value with the smallest test acceleration is found from the static stress table (FIG. 2) to be 0.021. Therefore, according to step S550, the buffer thickness is found to be 2.79 cm, and according to step S570, the buffer area is about 133.33 $cm^2$. Hence, the projection area of each of the surfaces of the object in contact with the buffer material is larger than or equal to 133.33 $cm^2$.

As shown in FIG. 5, in step S580, the buffer packing type that fits the requirements is displayed. In other words, according to the buffer thickness T obtained in step S550 and the buffer area A obtained in step S570, the buffer packing size of this buffer packing type is calculated according to the selected buffer packing type. Since the buffer packing type includes a number of leg cushions, there is a need to calculate the sizes of these leg cushions that match the buffer thickness and the buffer area. Next, among the buffer packing types selected in step S520, the buffer packing type is determined according to the calculated buffer packing size. The buffer packing size that matches the requirements can be found from the database and then the buffer packing type and size may be displayed on a display unit (for example, a screen).

Finally, in step S590, cost data related to the buffer packing type that matches the requirements is extracted from the database and displayed on the screen. In addition, if there is a cost limitation, a comparison of the cost data may be displayed to provide the user with a choice or the system may automatically perform a pairing action to select an appropriate buffer packing type and size.

It should be noted that the present invention may be executed on a computer system. The present invention can be designed as a computer program by using any suitable programming languages, and the computer program can be stored in a computer accessible storage medium (for example, an optical disc or a hard drive). The computer program can be loaded into a computer system so that the computer system can execute the foregoing method for automatically designing a buffer packing size. In other words, a software package is developed especially for executing the actions according to the foregoing embodiment. For example, the object that needs to be packed is input or the commonly selected items are listed out to provide the user with a panel of choices. When the condition parameters are verified, the computer program may perform the necessary calculations according to the condition parameters and display the buffer packing types and sizes from the database that satisfies the calculated conditions. Furthermore, the results may be listed according to the cost requirements. However, the method of executing the computer program described herein is only an example of implementing the present invention and is not intended to limit the scope of the present invention.

In summary, the present invention has at least the following advantages.

1. A buffer packing size can be automatically designed by using a computer program. Thus, a considerable time for designing the packing can be saved.
2. The data after a buffer packing design can be stored in a database to serve as reference material in a subsequent design.
3. People not familiar with the design in this area may understand the process of designing buffer packing size quickly. Moreover, the method is easy to use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method performed by a computer system for automatically designing a buffer packing, wherein the buffer packing is used for buffering an object against an impact, comprising:
    providing in a computer database a static stress table relating static stress values for different test accelerations and test heights for a plurality of buffer materials, a plurality of buffer thicknesses and a plurality of buffer packing types;
    receiving from a user weight, W of the object to be packed, a user selected buffer material and a user selected buffer packing type;
    receiving from the user a test height, H for impact testing, a test acceleration, G' and a safety factor, a' to be used for the buffer material;
    calculating by the computer system a buffer thickness, T to provide specified safety factor using a formula T=(H*a')/G';
    obtaining by the computer system, a static stress value, S from the static stress table using the test height H, the test acceleration G', the calculated buffer thickness T and the user selected buffer material and buffer packing type;
    calculating by the computer system a buffer area, A for buffering the object against the impact using the formula A=W/S; and
    designing the buffer packing of the user selected buffer material and buffer packing type using the calculated buffer area and buffer thickness.

2. The method of claim 1, further comprising:
    providing a database, wherein the database comprises a plurality of buffer packing types;
    searching by the computer system the database according to the buffer thickness, T and the buffer area, A for buffer packing types that match a plurality of requirements; and
    displaying by the computer system the buffer packing types that match the requirements.

3. The method of claim 2, further comprising:
extracting by the computer system cost data of the buffer packing types that match the requirements from the database; and
displaying by the computer system the cost data of the buffer packing types that match the requirements.

4. The method of claim 3, further comprising:
comparing the displayed cost data of the buffer packing types that match the requirements;
selecting another buffer packing type that match the requirements; and
designing the buffer packing of the user selected buffer material and another buffer packing type using the calculated buffer area and buffer thickness.

5. The method of claim 1, wherein the step of obtaining by the computer system, a static stress value, S from the static stress table comprises:
obtaining by the computer system the static stress value corresponding to a smallest test acceleration from the static stress table.

6. A computer accessible storage medium storing computer executable instructions, which when executed on a computer system perform automatic design of a buffer packing used for buffering an object against an impact, the computer instructions comprising instructions for:
receiving from a user weight, W of the object to be packed, a user selected buffer material and a user selected buffer packing type;
receiving from the user a test height, H for impact testing, a test acceleration, G' and a safety factor, a' to be used for the buffer material;
calculating a buffer thickness, T to provide specified safety factor using a formula $T=(H*a')/G'$;
obtaining from a static stress table stored in a computer database a static stress value, S using the test height H, the test acceleration G', the calculated buffer thickness T and the user selected buffer material and buffer packing type;
calculating a buffer area, A for buffering the object against the impact using the formula $A=W/S$; and
designing the buffer packing of the user selected buffer material and buffer packing type using the calculated buffer area and buffer thickness.

7. The storage medium of claim 6, further comprising instructions for:
providing a database, wherein the database comprises a plurality of buffer packing types;
searching the database according to the buffer thickness, T and the buffer area, A for buffer packing types that match a plurality of requirements; and
displaying the buffer packing types that match the requirements.

8. The storage medium of claim 7, further comprising instructions for:
extracting cost data of the buffer packing types that match the requirements from the database; and
displaying the cost data of the buffer packing types that match the requirements.

9. The storage medium of claim 8, further comprising instructions for:
comparing the displayed cost data of the buffer packing types that match the requirements;
selecting another buffer packing type that match the requirements; and
designing the buffer packing of the user selected buffer material and another buffer packing type using the calculated buffer area and buffer thickness.

10. The storage medium of claim 6, wherein the step of obtaining a static stress value, S from the static stress table comprises:
obtaining the static stress value corresponding to a smallest test acceleration from the static stress table.

* * * * *